United States Patent [19]

Okamoto et al.

[11] 4,018,739
[45] Apr. 19, 1977

[54] TAR-URETHANE COMPOSITION

[75] Inventors: Masahiro Okamoto; Morio Kimura, both of Kitakyushu; Teruo Shibuya, Kawasaki; Shinji Yamamoto, Ichihara; Shinichi Hasegawa, Settsu; Yutaka Terada, Nishinomiya; Teruho Adachi, Toyonaka, all of Japan

[73] Assignees: Sumitomo Chemical Company, Limited, Osaka; Nittetsu Chemical Industrial Co., Ltd., Tokyo, both of Japan

[22] Filed: Aug. 26, 1975

[21] Appl. No.: 607,962

Related U.S. Application Data

[63] Continuation-in-part of Ser. No. 368,376, June 8, 1973, abandoned.

[30] Foreign Application Priority Data

June 9, 1972  Japan .............................. 47-58053

[52] U.S. Cl. .......................... 260/59 R; 260/51 R; 260/53 R; 260/57 R
[51] Int. Cl.² ...................... C08G 2/28; C08G 2/30
[58] Field of Search ............. 260/51 R, 53 R, 57 R, 260/59

[56] References Cited

UNITED STATES PATENTS

| | | | |
|---|---|---|---|
| 2,608,536 | 8/1952 | Sterling | 260/59 X |
| 3,271,331 | 9/1966 | Ender | 260/2.5 |
| 3,409,579 | 11/1968 | Robins | 260/59 X |
| 3,632,531 | 1/1972 | Rush et al. | 260/59 X |
| 3,835,077 | 9/1974 | Mori et al. | 260/28 |
| 3,862,089 | 1/1975 | Shinohara | 260/53 R |

FOREIGN PATENTS OR APPLICATIONS

| | | |
|---|---|---|
| 1,557,726 | 7/1969 | France |
| 7,009,954 | 1/1971 | Netherlands |

*Primary Examiner*—Edward M. Woodberry
*Attorney, Agent, or Firm*—Sughrue, Rothwell, Mion, Zinn & Macpeak

[57] ABSTRACT

A tar-urethane composition comprising (1) an isocyanate-reactive tar obtained by reacting a tar produced as a by-product in the phenol synthesis via hydroperoxides with a formaldehyde in the presence of a basic catalyst and in the presence or absence of at least one phenol compound and (2) a polyisocyanate, which is useful as coating agents, materials for pavement, floor linings, sealing materials and the like.

22 Claims, No Drawings

TAR-URETHANE COMPOSITION

This application is a Continuation-in-Part application of Ser. No. 368,376, filed June 8, 1973, now abandoned.

This invention relates to a tar-urethane composition and, more specifically, it relates to a tar-urethane composition comprising (1) an isocyanate-reactive tar obtained by condensation of a tar produced as a by-product in the synthesis of phenols via hydroperoxides with a formaldehyde in the presence of a basic catalyst and in the presence or absence of at least one phenol represented by the formula

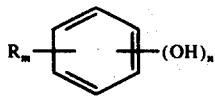

wherein R represents an alkyl group having 1 to 8 carbon atoms, m represents 0 (zero) or an integer of 1 or 2 and n represents an integer of 1 or 2, and (2) a polyisocyanate.

Heretofore, tar-urethane composition have been used for a wide variety of applications such as paints, materials for pavement, floor linings, sealing materials, and the like because of their excellent mechanical strength, chemical resistance and the like.

The essential components of the tar-urethane composition are a basic substance comprising a polyol and a bituminous material such as coal tar, coal tar pitch, etc., and a polyisocyanate as a curing agent. However, the polyols employed in the conventional tar-urethane compositions are generally expensive and, in particular, the tar-urethane compositions having excellent mechanical strength and chemical resistance prepared in the conventional technique generally require expensive polyols to achieve the desired properties.

As a result of extensive researches on tars and polyols suitable especially for a tar-urethane composition, it is found that a specific tar, which is obtainable by reacting a tar produced as a by-product (hereinafter referred to as "by-product tar") in the synthesis of phenols via the corresponding hydroperoxides with a formaldehyde in the presence of a basic catalyst, exhibits a high reactivity with a isocyanate, and, as a result of further investigations on the basis of the above finding, it is found that a tar-urethane composition having excellent physical properties can be obtained at low cost from a combination of the above specified tar (hereinafter referred to as "isocyanate-reactive tar") and a polyisocyanate.

The term "synthesis of phenols via hydroperoxides" referred to in the specification and claims of this invention means the synthesis of phenols through the corresponding hydroperoxides intermediates such as the phenol synthesis by the cumene process, the cresol synthesis by the cymene process and the synthesis of resorcin or hydroquinone from diisopropylbenzene, etc. The term by-product tar used herein means a high boiling component residue obtained from distilling off the desired phenols from the acid decomposition product of hydroperoxides. The by-products include distillable acetophenones, α-methylstyrenes, alkylphenols, etc., each being contained in small amounts and the large proportion of the by-products comprises unidentified materials including non-distillable tar-like materials. In the reaction of the by-product tar and a formaldehyde, the above by-products may be present in various proportions. That is, the by-product tar may be a residual heavy oil component after distillation of phenols from an acid decomposition product of hydroperoxides, or a residue obtained after distillation of relatively low boiling fractions from the heavy oil, or a medium fraction, or a pitch-like material obtained from distillation of a medium fraction, etc.

In the present invention, coal tar, coal tar pitch, etc. cannot be used as a starting tar because the above coal tar or coal tar pitch is considered to have few functional group reactive with a formaldehyde. It has been found that the tar obtained by reacting coal tar, coal tar pitch and the like with a formaldehyde in the presence of a basic catalyst is hardly reacted with an isocyanate and is not practically valuable.

The formaldehyde which can be used in the present invention is commercially available and examples of the formaldehyde are paraformaldehyde, formalin, etc. The basic catalyst used in the present invention includes sodium hydroxide, potassium hydroxide, aqueous ammonia, an amine and the like, and from the practical standpoint, especially from the subsequent concentration step, aqueous ammonia is a preferred basic catalyst. On the other hand, in order to assure a product having a high reactivity with an isocyanate, it is appropriate to use an amine as a basic catalyst. The amine which can be used in the present invention includes an aliphatic or aromatic primary, secondary or tertiary amine, for example, triethylamine, dimethyl benzylamine, trimethylamine, triethanolamine, diethylamine, benzylamine, and the like.

In an alternative procedure according to the present invention, at least one phenol represented by the formula

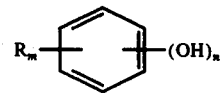

wherein R represents an alkyl group having 1 to 8 carbon atoms, m is zero or an integer of 1 or 2, and n is an integer of 1 or 2, may optionally be added to the starting by-product tar in order to assure an improved reactivity of the resulting tar with an isocyanate. The addition of phenol appears to increase the reactivity with a formaldehyde whereby the hydroxy content available to the reaction with an isocyanate can be increased. Representative examples of the phenol which can be added to the by-product tar include, for example, phenol, cresols, xylenols, t-butylphenol, octylphenol, resorcin, and the like.

The proportion of the by-product tar, a formaldehyde, a basic catalyst and, optionally, phenols can be determined depending upon, among others, the viscosity (or a softening point) and reactivity of the isocyanate-reactive tar. Generally, the formaldehyde can preferably be used in a proportion of from 2 to 25 parts by weight as paraformaldehyde per 100 parts by weight of the by-product tar. Although the proportion of the base as a catalyst varies depending upon the desired reaction rate, sodium hydroxide or potassium hydroxide can be used in a proportion of from 1 to 5 parts by weight as 10N solution per 100 parts by weight of the by-product tar, the aqueous ammonium (as 28% ammonia) can preferably be used in a proportion of from 5 to 10 parts by weight per 100 parts of the by-product tar and the amine can preferably be used in a proportion of from 1 to 8 mol% based on the formaldehyde used.

As described previously, phenols can be used if an increased reactivity of the isocyanate-reactive tar is desirable. The amount of the phenols can be varied depending upon the desired reactivity and viscosity of the resulting tar. That is, the hydroxy content, i.e., the reactivity with an isocyanate, in the resulting tar can be increased as the amount of phenols added increases, and the viscosity of the resulting tar also tends to increase proportionally to the amount of phenols added. Generally, the phenols can preferably be added in a proportion less than 25 parts by weight, preferably 3 to 15 parts by weight, per 100 parts by weight of the by-product tar.

In preparing an isocyanate-reactive tar from the above mixture (a by-product tar, a formaldehyde, a basic catalyst and, optionally, phenols), the reaction can be carried out at a reaction temperature in the range of from 50° to 140° C, preferably from 80° to 120° C for a period of from 1 to 8 hours. After completion of the reaction, the reaction mixture is distilled under reduced pressure to remove water, catalyst or unreacted materials. The resulting isocyanate-reactive tar can be obtained in various state, i.e., from a viscous liquid to a solid having a softening point greater than 100° C depending upon the type of starting materials and reaction conditions employed in the reaction.

The isocyanate-reactive tar thus obtained can be cured by the reaction with a polyisocyanate thereby exhibiting excellent physical properties. The polyisocyanates which can be used in the present invention are those commercially available and include, for example, hexamethylene diisocyanate, xylylene diisocyanate, tolylene diisocyanate, 4,4'-diphenylmethane diisocyanate, an adduct of tolylene diisocyanate and trimethylolpropane or a mixture thereof, or a prepolymer obtained by reacting an excess amount of the above polyisocyanate with a polyol such as a polyester, polyether, castor oil and the like, or a mixture of such prepolymers, as well as a mixture of the polyisocyanate and the prepolymer as specified above. The polyisocyanate is generally used in a proportion of 0.1 to 0.5 gram equivalent as isocyanate group per 100 grams of the isocyanate-reactive tar.

As is apparent from the above, the essential components of the tar-urethane composition of this invention are an isocyanate-reactive tar and a polyisocyanate and, therefore, the present invention makes it possible to provide a tar-urethane composition at low cost without using expensive polyols which are commonly employed in the conventional tar-urethane compositions. In addition to the above essential components, various additives employed in the conventional tar-urethane composition can optionally be incorporated into the tar-urethane composition of this invention. These additives include curing catalysts, fillers, diluents, solvents, dehydrating agents, resins and the like.

Examples of the curing catalyst are the curing accelerator such as tertiary amines, e.g., triethylamine, organometallic compounds, e.g., dibutyltin dilaurate, etc., as well as the curing retardant such as phenols, organic halides, etc.

Examples of the filler are the inert filler such as talc, clay, mica, siliceous sand, etc. and the colored pigment such as red iron oxide, aluminum powder, carbon black, etc.

Examples of the diluent include dioctyl phthalate (DOP), dibutyl phthalate (DBP) and aromatic fractions having a boiling point of 200° to 380° C derived from petroleum or coal tar. Examples of the above aromatic fraction are heavy residue obtainable from the ethylene plant using crude oil or naphtha as a feed stock, creosote oil, anthracene oil, washing oil, pitch oil, naphthalene oil free from crystals and the like.

Examples of the solvent are aromatic hydrocarbons such as toluene, xylene, and the like, ester such as ethyl acetate, butyl acetate, and the like, ketones such as methylethyl ketone, methylisobutyl ketone, and the like, and acetate cellosolve and the like.

Examples of the resin are coumaron resins, petroleum resins, and the like.

Examples of the dehydrating agent are calcined gypsum, molecular sieve, and the like.

In the preparation of the present tar-urethane composition, the isocyanate-reactive tar may be optionally admixed with the aforesaid additives by means of a ball mill, a three rollers mill, a mixer or a kneader, then to prepare a base, and, on the other hand, the polyisocyanate may be optionally admixed with the solvent to prepare a hardener. Both of the base and hardener can be mixed immediately before the application to a material, and the mixture can be applied to the material according to the conventional manner.

The tar-urethane composition of the present invention can be used for the same utilities as those of the conventional tar-urethane compositions, i.e. for coating materials. For example, it can be used as water proof agents, as various lining agents for waterway, floor, repair of road, anti-skid treatment of road, surface protecting of concrete, as binders for pavement and color pavement, and as a filler for the crack in concrete, as a segment sealing material for the shield work.

The present invention is further illustrated by the following examples but they are not to be construed as limiting the scope of this invention. The part used in Examples is by weight unless otherwise indicated.

EXAMPLE 1

40 parts of a by-product tar obtained in the cresol synthesis by the cymene method, 7.2 parts of 84% paraformaldehyde and 3.2 parts of 28% aqueous ammonia were reacted at reflux for a period of about 4 hours and the reaction mixture was distilled under reduced pressure (200 mmHg) at a temperature up to 210° C to remove water and unreacted materials.

The resulting tar was an isocyanate-reactive tar as a black-brown solid having a softening point of 87° C and a hydroxy content of 3.06%.

4 parts of a creosote oil was added to 6 parts of the above tar and to the resulting mixture was added crude 4,4'-diphenylmethane diisocyanate in such an amount that the resulting mixture contains hydroxy groups and isocyanate groups in a stoichiometrically equivalent amount. The time required for gelation of the tar thus obtained was found to be 20.8 minutes in a scale of 10 g at 25° C.

Solution A having the following composition was prepared using the above tar:

| Solution A | Tar | 55 parts |
|---|---|---|
| | Refined Castor Oil | 13 parts |
| | Creosote Oil | 32 parts |

10 parts of Solution A and 87 parts of siliceous sand were thoroughly blended in a mixer and 3 parts of Solution B having the following composition was added to the blend followed by thoroughly mixing.

| Solution B | Crude 4,4'-Diphenylmethane Diisocyanate | 90 parts |
|---|---|---|
| | Toluene | 10 parts |

The resulting resin mortar composition was then spread in a thickness of 5 mm on the surface of a concrete having previously coated thereon a primer of the following composition in an amount of 100 g/m² and the surface was finished with a trowel.

| Primer Composition | Solution A | 50 parts |
|---|---|---|
| | Solution B | 20 parts |
| | Toluene | 30 parts |

The mortar thus obtained was found to have a strength withstanding the passage of automobiles after cured 8 hours at a temperature of 5° C.

EXAMPLE 2

30 parts of a by-product tar (obtained in the cresol synthesis by the cymene method) from which low boiling fractions having a boiling point below 135° C/30 mmHg had been removed, 1.5 parts of 84% paraformaldehyde and 0.17 parts of triethylamine were reacted at a temperature of 110° C for 1.5 hours and the reaction mixture was distilled at 110° C under reduced pressure (25 mmHg) to obtain an isocyanate-reactive tar having a viscosity of 150 poise at 25° C and a hydroxy content of 4.86%. The isocyanate-reactivity of the resulting tar was determined by measuring the gelation time in the same manner as described in Example 1 and found to be 8.5 minutes.

Solution A having the following composition was prepared from the resulting tar:

| Solution A | Tar | 63 parts |
|---|---|---|
| | Refined Castor Oil | 12 parts |
| | Creosote Oil | 25 parts |
| Solution B | — Crude 4,4'-Diphenylmethane Diisocyanate | 25 parts |

Solution A and Solution B were mixed in a proportion of 75:25 by volume, and the mixture was spread on the surface of asphalt concrete which has been cleaned in a proportion of 1.5 Kg/m². The surface was flattened by a rake and an emery powder having a particle size in the range of from 1.2 to 2.5 mm was spread on the flat surface in a proportion of 10 Kg/m² followed by being compressed by a vibrator. After 6 hours curing, any excess of the emery powder was recovered and the surface was paved to make it anti-skid. The resulting anti-skid pavement was found to be withstood to the passage of automobiles and had an excellent anti-skid effect.

EXAMPLE 3

100 parts of a by-product tar obtained in the cresol synthesis by the cymene method, 10 parts of phenol, 10.7 parts of 84% paraformaldehyde and 1.2 parts of triethylamine were reacted at a temperature of 110° C for 1 hour and the resulting reaction mixture was distilled at 110° C under reduced pressure of from 20 to 30 mmHg to obtain an isocyanate-reactive tar having a viscosity of 60 poise at 25° C and a hydroxy content of 6.25%. The gelation time of the resulting tar was found to be as fast as 1.8 minutes at 25° C. The mortar was prepared in the same manner as described in Example 1 and paved. The resulting paved mortar was withstood to the passage of automobiles after being cured at 5° C for 4 hours. The mortar prepared in this Example was cured considerably rapidly as compared with that observed in Example 1.

EXAMPLE 4

100 parts of a by-product tar obtained in the cresol synthesis by the cymene method, 10 parts of m-cresol, 10 parts of 84% paraformaldehyde and 1.1 parts of triethylamine were reacted at a temperature of 110° C for 1 hour, and the resulting reaction mixture was distilled under reduced pressure of from 20 to 30 mmHg to obtain an isocyanate-reactive tar having a viscosity of 59 poise at 25° C and a hydroxy content of 7.15%.

| Solution A | Tar | 30 parts |
|---|---|---|
| | Refined Castor Oil | 10 parts |
| | Creosote Oil | 10 parts |
| | Toluene | 10 parts |
| | Clay | 35 parts |
| | Red Iron Oxide | 5 parts |
| Solution B | Crude 4,4'-Diphenylmethane Diisocyanate | 90 parts |
| | Toluene | 10 parts |

Solution A and Solution B were mixed in a proportion of 90:10 by volume, and the mixture was spread on the surface of concrete which had been cleaned to obtain a seamless floor coating. The coating was cured within 5 hours sufficiently to allow walking.

EXAMPLE 5

100 parts of a by-product tar obtained in the phenol synthesis by the cumene method, 10 parts of 84% paraformaldehyde and 5 parts of 28% aqueous ammonia were reacted at reflux for a period of 5 hours and the resulting reaction mixture was distilled under reduced pressure of 20 to 30 mmHg at a temperature of 110° C to obtain an isocyanate-reactive tar having a viscosity of 60 poise at 25° C.

Solution A having the following composition was then prepared using the above modified tar:

| Solution A | Tar | 65 parts |
|---|---|---|
| | Refined Castor Oil | 15 parts |
| | Aromatic Fractions derived from Ethylene Bottom | 20 parts |

-continued

| | | |
|---|---|---|
| | (b.p. 200 to 350° C, $d_{15}^4$ 1.032) | |
| Solution B | Crude 4,4'-Diphenylmethane Diisocyanate | 90 parts |
| | Toluene | 10 parts |

Solution A and Solution B were mixed in a proportion of 80:20 and the anti-skid paving was conducted in the same manner as described in Example 2 to obtain a pavement having excellent properties.

EXAMPLE 6

100 parts of a by-product tar obtained in the resorcin and hydroquinone synthesis from diisopropylbenzene was dissolved in 50 parts of toluene, and 10 parts of paraformaldehyde and 5 parts of 28% aqueous ammonia was added to the solution. The mixture was then reacted at reflux for a period of 3 hours and the resulting reaction mixture was distilled under reduced pressure of from 20 to 30 mmHg at a temperature up to 150° C to remove toluene, water and unreacted materials whereby an isocyanate-reactive tar was obtained as a black-brown solid having a softening point of 97° C.

Solution A having the following composition was then prepared using the thus obtained isocyanate-reactive tar and the starting by-product tar, respectively.

| | | |
|---|---|---|
| Solution A | By-product Tar or Isocyanate-Reactive Tar | 60 parts |
| | Polypropylene Glycol (Average Molecular Weight: 400) | 30 parts |
| | 4,4'-Diaminodiphenyl-methane | 10 parts |

To each of the above Solution A, there was added Solution B comprising a commercially available urethane prepolymer having a 4% isocyanate content (viscosity, 7000 c.p. at 25° C) in a proportion of 100:60 (A:B) while stirring, and the resulting blend was poured into a metal die having a thickness of 2 mm followed by being cured at room temperature for one day to obtain a sheet. The sheet thus obtained was then allowed to stand in toluene for a period of 1 month. At the end of this period, the sheet prepared from the starting by-product tar was found to be swelled and also to be decreased in its mechanical strength, while the sheet prepared from the isocyanate-reactive tar was found to have no changes in the appearance and the mechanical strength.

EXAMPLE 7

This example compares the present invention to the tar-urethane composition of Ser. No. 294,947, filed Oct. 4, 1972 now U.S. Pat. No. 3,835,077.

The experiments were carried out as follows:

1) Tar
  S Resin — produced by a method described in above Example 3.
  NP-101 — the tar which is a distillation residue (b.p. higher than 200° C) derived from the preparation of cresol from cymene.

2) Curing agent
  Cuamine MT (product of Ihara Chemical Co.)

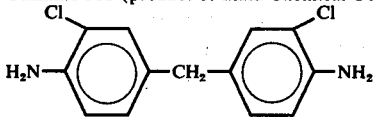

3) Isocyanate prepolymer
  Takenate L-1010 (product of Takeda Chemical Industries
  NCO content: 4% by weight
  (tolylenediiosocyanate-polypropylene glycol prepolymer)

2. Test Method

1. The mixture of the said tar and Cuamine MT was dissolved at about 80° to 100° C, and the resulting solution was cooled and mixed with xylene in order to decrease the viscosity. (Tar component)

2. The said tar component was mixed with Takenate L-1010 at room temperature, and after defoaming in vacuo, the mixture was led into a mold to prepare a sheet of 2 mm in thickness.

3. After aging the sheet at 20° C for 10 days, physical properties of the sheet was measured according to JIS K 6301.

4. Thermal resistance test: 110° C × 6 hrs. Boiling resistance test: 6 hrs.

3. Results

The results of comparative experiments are as shown in the following table.

TABLE

| | Exp. No. | 1 | 2 | 3 | 4 |
|---|---|---|---|---|---|
| blending parts/by wt. | S resin | 100 | 100 | | |
| | NP-101 | | | 100 | 100 |
| | Cuamine MT | 10 | 12 | 10 | 12 |
| | Xylene | 20 | 20 | 10 | 10 |
| | Takenate L-1010 | 100 | 100 | 100 | 100 |
| Normal physical properties | Hardness (Hs) | 42 | 46 | 40 | 43 |
| | Tensile strength Kg/cm² | 27.8 | 33.5 | 24.4 | 24.5 |
| | Elongation % | 530 | 580 | 470 | 500 |
| Thermal resistance | Hardness (Hs) | 52 | 56 | 48 | 50 |
| | Tensile strength Kg/cm² | 51.7 | 58.0 | 44.1 | 45.2 |
| | Elongation % | 450 | 470 | 420 | 430 |
| | Weight loss % | −11.2 | −11.5 | −13.4 | −14.1 |
| | *Retention percent of tensile strength % | 186 | 173 | 180 | 184 |
| Boiling resistance | Hardness (Hs) | 48 | 50 | 41 | 43 |
| | Tensile strength Kg/cm² | 34.3 | 37.6 | 25.8 | 26.4 |
| | Elongation % | 520 | 540 | 510 | 510 |
| | Weight loss % | −7.0 | −7.3 | −12.0 | −12.4 |
| | *Retention percent of tensile strength % | 123 | 112 | 105 | 107 |

TABLE-continued

| Exp. No. | 1 | 2 | 3 | 4 |
|---|---|---|---|---|

*Retention percent of tensile strength (%) = $\frac{\text{Tensile strength after the thermal or boiling treatment}}{\text{Tensile strength under normal condition}} \times 100$

EXAMPLE 8

This example compares the isocyanate-reactive tar of this application with the phenol resin of Netherlands application No. 7,009,954, particularly with respect to thermosetting properties thereof.

The results of comparative experiments are as shown in the following Table.

TABLE

| | Isocyanate-reactive tar* | Phenolic resin** |
|---|---|---|
| Gel time (sec.)[1] | >1200 | 77 |
| Insolubility of [2] the hardened product in acetone (%) | 0 (not hardened) | 99.5 |

Note:
*Isocyanate-reactive tar produced by the method described in Example 3 of this application.
**Phenolic resin produced in the presence of an alkaline catalyst according to the method described in Example 5 of Dutch Pat. Appln No. 7009954.
[1]Time required for gelatin of the test sample (0.5 g) on a hot plate of 170° C.
[2]The test sample was allowed to harden on an oil bath for 150° C for one hour, and the product hardened was pulverized and extracted with hot acetone. The amount (% by weight) of the product not extracted in acetone was weighed.

From this experiment, it is concluded that the isocyanate-reactive tar of this application is not thermosettable while the phenolic resin described in Dutch application No. 7,009,954 is thermosettable.

EXAMPLE 9

In this example, comparisons are made regarding the significance of the polyol components of the present application, which are obtained either without use of phenol or with use of a relatively small amount of phenol and the tar-urethane compositions containing a resulting polyol, in comparison with the physical properties of the compositions obtained according to Netherlands application No. 7,009,954 and French patent No. 1,557,726.

I. Preparation of Resin (Polyol) and physical properties thereof

Resin (Polyol) Nos. 1 to 4 were prepared by reacting the materials shown in Table 1 shown below, at 105° C for 2 hours, and then heating the resulting reaction mixture under 15 to 20 mmHg to remove water and materials having a lower boiling point. Parts and % are by weight.

Table 1

| Component: | Resin (Polyol) No. | | | |
|---|---|---|---|---|
| | 1 | 2 | 3 | 4 |
| By-product Tar (parts) | 100 | 87 | 70 | 50 |
| Phenol (parts) | 0 | 13 | 30 | 50 |
| (By-product tar/phenol) | (100/0) | (100/15) | (70/30) | (50/50) |
| 85% Paraformaldehyde (parts) | 7 | 7 | 7 | 7 |
| Triethylamine (parts) | 2 | 2 | 2 | 2 |
| Physical Property: | | | | |
| Viscosity (ps at 25° C) | 790 | 5,400 | Semi-solid | Solid |
| Softening point (° C) | — | — | 38 | 62 |
| OH Content (%) | 4.1 | 5.5 | 9.2 | 11.6 |

Table 1-continued

| Component: | Resin (Polyol) No. | | | |
|---|---|---|---|---|
| | 1 | 2 | 3 | 4 |
| Pot Life* (min/25° C) | 52 | 13 | 2 | <1 |

Note:
*Time until gelling of the solution prepared by dissolving 50g of the resin (polyol) in 20g of toluene and adding thereto Sumidur 44V-20 (described in Table 2 hereinafter) so that the OH content and NCO content were equivalent.
Resin Nos. 1 and 2: Resins obtained according to the above-identified application
Resin Nos. 3 and 4: Resins obtained according to the prior art.

II. Preparation of varnish (tar-urethane composition) and physical properties thereof Using 100 parts of each resin, 20 parts of Uniol D-2000, 60 parts of EX-50 and Sumidur 44V-20 in the proportion listed in Table 2 below, varnishes I-a, I-b, I-c and I-d were prepared.

Using each varnish thus obtained and silica sand in a weight ratio of 13:87, a mortar of 4×4×16 cm was prepared, and after leaving the mortar for 7 days at 20° C, the strength of the mortar was measured in accordance with the criteria of JIS R5201.

The results thus obtained are shown in Table 2 below.

Table 2

| Component (parts): | Varnish I | | | |
|---|---|---|---|---|
| | I-a | I-b | I-c | I-d |
| A: | | | | |
| Resin | No. 1 | No. 2 | No. 3 | No. 4 |
| | 100 | 100 | 100 | 100 |
| Uniol D-2000[1] | 20 | 20 | 20 | 20 |
| EX-50[2] | 60 | 60 | 60 | 60 |
| B: | | | | |
| Sumidur 44V-20[3] | 39 | 53 | 88 | 111 |
| Viscosity (cp at 25° C): | | | | |
| (A) | 490 | 930 | 4,300 | 9,400 |
| (B) | 300 | 300 | 300 | 300 |
| (A)+(B) | 450 | 790 | 1,800 | 5,900 |
| Physical Property of Resin Mortar: | | | | |
| Pot Life (min/25° C) | 101 | 32 | 4 | 1 |
| Workability | usable | usable | Unusable | Unusable |
| Bending Strength (kg/cm²) | 42.5 | 52.0 | Measurement impossible | Measurement impossible |
| Compressive Strength (kg/cm²) | 113 | 125 | " | " |

Note:
[1]Polyoxypropylene glycol having a molecular weight of about 2,000, manufactured by Nippon Oils & Fats Co., Ltd.
[2]Diluent, manufactured by Kureha Chemical Industry Co.
[3]Crude 4,4'-diphenylmethane diisocyanate, manufactured by Sumitomo Bayer Urethane Co., Ltd.

Since the measurement of the physical properties of the mortars which were prepared using Resin Nos. 3 and 4 was impossible even though the amount of each component in (A) was the same as in Resins 1 and 2, Varnishes II-a, II-b, II-c and II-d having almost the same viscosity were prepared using the materials shown in Table 3 below by varying the amount of EX-50 (diluent).

Using each varnish thus obtained and silica sand in a weight ratio of 13:87, a mortar 4×4×16 was prepared, and after leaving the mortar for 7 days at 20° C, the strength of the mortar was measured in accordance with the criteria of JIS R5201.

The results thus obtained are shown in Table 3 below.

Table 3

| Component (parts) | Varnish II | | | |
|---|---|---|---|---|
| | II-a | II-b | II-c | II-d |
| A: | | | | |
| Resin | No. 1 | No. 2 | No. 3 | No. 4 |
| | 100 | 100 | 100 | 100 |
| Uniol D-2000 | 20 | 20 | 20 | 20 |
| EX-50 | 60 | 65 | 80 | 90 |
| B: | | | | |
| Sumidur 44V-20 | 39 | 53 | 88 | 111 |
| Viscosity (cp at 25° C): | | | | |
| (A) | 490 | 495 | 520 | 535 |
| (B) | 300 | 300 | 300 | 300 |
| (A)+(B) | 450 | 450 | 460 | 475 |
| Physical Property of Resin Mortar | | | | |
| Pot Life (min/25° C) | 101 | 38 | 8 | 3 |
| Workability | Usable | Usable | Unusable | Unusable |
| Bending Strength (kg/cm²) | 42.5 | 45.0 | 28.5 | Measurement impossible |
| Compressive Strength (kg/cm²) | 113 | 125 | 83 | " |

From the data of Example 9, it is seen that the pot life of resin (polyol) and varnish (tar-urethane composition) containing the resin according to the present invention are superior to that of the prior art. It is also apparent from the data of Tables 2 and 3 of Example 9 that the varnishes obtained according to the present application are superior in workability, bending strength and compressive strength as compared to the prior art.

While the invention has been described in detail and with reference to specific embodiments thereof, it will be apparent to one skilled in the art that various changes and modifications can be made therein without departing from the spirit and scope thereof.

What is claimed is:

1. A tar-urethane composition consisting essentially of (1) a non-thermosetting isocyanate-reactive tar obtained by reacting a tar produced as a by-product in the phenol synthesis via hydroperoxides with a formaldehyde in the presence of a basic catalyst selected from the group consisting of sodium hydroxide, potassium hydroxide, aqueous ammonia and amines and (2) a polyisocyanate, wherein said tar produced as a by-product in the phenol synthesis is a high boiling fraction obtained after distillation of phenols from the acid decomposition product of hydroperoxides produced in the phenol synthesis by the cumene method, the cresol synthesis by the cymene method or the resorcin and hydroquinone synthesis from diisopropylbenzene.

2. A tar-urethane composition consisting essentially of (1) a non-thermosetting isocyanate-reactive tar obtained by reacting a tar produced as a by-product in the phenol synthesis via hydroperoxides with a formaldehyde and at least one phenol compound, wherein the phenol compound is used in a proportion of from 3 to 15 parts by weight per 100 parts by weight of the by-product tar, said phenol compound being represented by the formula:

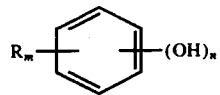

wherein R represents an alkyl group having 1 to 8 carbon atoms, $m$ is zero or an integer of 1 or 2, and $n$ is an integer of 1 or 2, in the presence of a basic catalyst, selected from the group consisting of sodium hydroxide, potassium hydroxide, aqueous ammonia and amines, wherein said tar produced as a by-product in the phenol synthesis is a high boiling fraction obtained after distillation of phenols from the acid decomposition product of hydroperoxides produced in the phenol synthesis by the cumene method, the cresol synthesis by the cymene method or the resorcin and hydroquinone synthesis from diisopropylbenzene and (2) a polyisocyanate.

3. A tar-urethane composition according to claim 1, wherein said amine is an aliphatic or aromatic primary, secondary or tertiary amine.

4. A tar-urethane composition according to claim 1, wherein said formaldehyde is paraformaldehyde or formalin.

5. A tar-urethane composition according to claim 1, wherein said reaction is carried out at a temperature in the range of from 50° to 140° C for a period of 1 to 8 hours.

6. A tar-urethane composition according to claim 1, wherein the polyisocyanate is at least one member selected from the group consisting of hexamethylene diisocyanate, xylylene diisocyanate, tolylene diisocyanate, 4,4'-diphenylmethane diisocyanate, an adduct of tolylene diisocyanate and trimethylolpropane and a prepolymer obtained by reacting an excess amount of the above polyisocyanate with a polyol.

7. A tar-urethane composition according to claim 1, wherein the formaldehyde is used in a proportion of from 2 to 25 parts by weight as paraformaldehyde per 100 parts by weight of the by-product tar.

8. A tar-urethane composition according to claim 1, wherein sodium hydroxide or potassium hydroxide is used in a proportion of from 1 to 5 parts be weight as 10N solution per 100 parts by weight of the by-product tar.

9. A tar-urethane composition according to claim 1, wherein the aqueous ammonia is used in a proportion of from 5 to 10 parts by weight as 28% ammonia per 100 parts of the by-product tar.

10. A tar-urethane composition according to claim 1, wherein the amine is used in a proportion of from 1 to 8 mol % based on the formaldehyde.

11. A tar-urethane composition according to claim 1, wherein the polyisocyanate is used in a proportion of 0.1 to 0.5 gram equivalent as isocyanate group per 100 grams of the isocyanate-reactive tar.

12. A tar-urethane composition according to claim 2, wherein said amine is an aliphatic or aromatic primary, secondary or tertiary amine.

13. A tar-urethane composition according to claim 2, wherein said formaldehyde is paraformaldehyde or formalin.

14. A tar-urethane composition according to claim 2, wherein said reaction is carried out at a temperature in the range of from 50° to 140° C for a period of 1 to 8 hours.

15. A tar-urethane composition according to claim 2, wherein the polyisocyanate is at least one member selected from the group consisting of hexamethylene diisocyanate, xylylene diisocyanate, tolylene diisocyanate, 4,4′-diphenylmethane diisocyanate, an adduct of tolylene diisocyanate and trimethylolpropane and a prepolymer obtained by reacting an excess amount of the above polyisocyanate with a polyol.

16. A tar-urethane composition according to claim 2, wherein the formaldehyde is used in a proportion of from 2 to 25 parts by weight as paraformaldehyde per 100 parts by weight of the by-product tar.

17. A tar-urethane composition according to claim 2, wherein sodium hydroxide or potassium hydroxide is used in a proportion of from 1 to 5 parts by weight as 10N solution per 100 parts by weight of the by-product tar.

18. A tar-urethane composition according to claim 2, wherein the aqueous ammonia is used in a proportion of from 5 to 10 parts by weight as 28% ammonia per 100 parts of the by-product tar.

19. A tar-urethane composition according to claim 2, wherein the amine is used in a proportion of from 1 to 8 mol % based on the formaldehyde.

20. A tar-urethane composition according to claim 2, wherein the polyisocyanate is used in a proportion of 0.1 to 0.5 gram equivalent as isocyanate group per 100 grams of theioscyanate-reactive tar.

21. A tar-urethane composition according to claim 1, wherein:
said reaction is carried out at a temperature in the range of from 50° to 140° C for a period of 1 to 8 hours;
the formaldehyde is used in a proportion of from 2 to 25 parts by weight as paraformaldehyde per 100 parts by weight of the by-product tar;
sodium hydroxide or potassium hydroxide is used in a proportion of from 1 to 5 parts by weight as 10N solution per 100 parts by weight of the by-product tar;
aqueous ammonia is used in a proportion of from 5 to 10 parts by weight as 28% ammonia per 100 parts by-product tar; and
the amine is used in a proportion of from about 1 to 8 mol percent based on the formaldehyde.

22. A tar-urethane composition according to claim 2, wherein:
said reaction is carried out at a temperature in the range of from 50° to 140° C for a period of 1 to 8 hours;
the formaldehyde is used in a proportion of from 2 to 25 parts by weight as paraformaldehyde per 100 parts by weight of the by-product tar;
sodium hydroxide or potassium hydroxide is used in a proportion of from 1 to 5 parts by weight of 10N solution per 100 parts by weight of the by-product tar;
aqueous ammonia is used in a proportion of from 5 to 10 parts by weight as 28% ammonia per 100 parts of by-product tar; and
the amine is used in a proportion of from 1 to 8 mol percent based on the formaldehyde.

* * * * *